US012661668B2

(12) United States Patent
Wright et al.

(10) Patent No.: US 12,661,668 B2
(45) Date of Patent: Jun. 23, 2026

(54) SELF REGULATING FLUID BEARING HIGH PRESSURE ROTARY RETARDER NOZZLE

(71) Applicant: STONEAGE, INC., Durango, CO (US)

(72) Inventors: Douglas E. Wright, Durango, CO (US); Daniel Szabo, Durango, CO (US)

(73) Assignee: StoneAge, Inc., Durango, CO (US)

( * ) Notice: Subject to any disclaimer, the term of this patent is extended or adjusted under 35 U.S.C. 154(b) by 0 days.

(21) Appl. No.: 17/411,327

(22) Filed: Aug. 25, 2021

(65) Prior Publication Data

US 2022/0062925 A1 Mar. 3, 2022

Related U.S. Application Data

(60) Provisional application No. 63/159,666, filed on Mar. 11, 2021, provisional application No. 63/070,953, filed on Aug. 27, 2020.

(51) Int. Cl.

*B05B 3/04* (2006.01)
*B05B 3/00* (2006.01)
*B05B 3/06* (2006.01)
*B05B 15/18* (2018.01)

(52) U.S. Cl.

CPC .............. *B05B 3/043* (2025.08); *B05B 15/18* (2018.02); *B05B 3/002* (2013.01); *B05B 3/003* (2013.01); *B05B 3/06* (2013.01)

(58) Field of Classification Search

CPC ........... B05B 3/06; B05B 3/003; B05B 3/002; B05B 15/18; B05B 3/0463
USPC .............................. 239/237, 225.1, 251, 259
See application file for complete search history.

(56) References Cited

U.S. PATENT DOCUMENTS 5,909,848 A 6/1999 Zink
7,139,219 B2 * 11/2006 Kolle ........................ G01V 1/40 166/321
7,510,062 B2 * 3/2009 Derr .......................... F16F 7/06 188/290

(Continued)

FOREIGN PATENT DOCUMENTS

KR 10-1590576 B1 2/2016
KR 20180063539 A 6/2018

OTHER PUBLICATIONS

Machine Translation of KR-101590576-B1 Description, Espacenet, May 2023, pp. 1-4 (Year: 2023).*

(Continued)

*Primary Examiner* — Kevin Edward Schwartz
(74) *Attorney, Agent, or Firm* — Sand, Sebolt & Wernow Co., LPA

(57) ABSTRACT

A rotary nozzle having a rotating shaft operating within a cylindrical housing is balanced by allowing passage of a small amount of pressurized fluid to be bled to an area between the outside of the opposite end of the shaft and the inside of the housing where the fluid force acts axially in an opposing direction upon the shaft to balance the axial inlet force exerted by the pressurized fluid. The balance of axial forces is self-regulating by controlling escape of the fluid through a tapered or frusto-conical region between the shaft and housing. A plurality of centrifugal weight segments around the inlet end of the shaft are thrust outwardly against the cylindrical housing to retard rotational speed while pressurized fluid around the centrifugal weight segments provides a fluid bearing between the weights and the housing.

18 Claims, 10 Drawing Sheets

(56) References Cited

U.S. PATENT DOCUMENTS

| | | | | |
|---|---|---|---|---|
| 7,635,096 | B2 | 12/2009 | Wright et al. | |
| 8,006,920 | B2 | 8/2011 | Wright et al. | |
| 8,016,210 | B2 | 9/2011 | Wright | |
| 9,399,230 | B2 * | 7/2016 | Wojciechowski, III | B05B 13/0636 |
| 2003/0071141 | A1 * | 4/2003 | Rieben | F16C 19/54 239/225.1 |
| 2006/0108745 | A1 * | 5/2006 | Van Schoor | F16J 15/164 277/500 |
| 2007/0108000 | A1 * | 5/2007 | Derr | E05D 11/084 188/290 |
| 2007/0257132 | A1 * | 11/2007 | Wright | B05B 15/18 239/259 |
| 2010/0025492 | A1 * | 2/2010 | Wright | B05B 3/06 239/258 |
| 2010/0065658 | A1 * | 3/2010 | Wright | B05B 3/002 239/259 |
| 2019/0032828 | A1 * | 1/2019 | Zink | F16L 37/086 |

OTHER PUBLICATIONS

International Search Report and Written Opinion, dated Nov. 10, 2021, from related International Patent App. No. PCT/US2021/047456.

* cited by examiner

SELF REGULATING FLUID BEARING HIGH PRESSURE ROTARY RETARDER NOZZLE

CROSS REFERENCE TO RELATED APPLICATIONS

This application claims the benefit of priority of U.S. Provisional patent application Ser. No. 63/070,953 filed Aug. 27, 2020, entitled Self Regulating Fluid Bearing High Pressure Rotary Retarder Nozzle, and the benefit of priority of U.S. Provisional Patent Application Ser. No. 63/159,666, filed Mar. 11, 2021, having the same title.

BACKGROUND OF THE DISCLOSURE

The present disclosure provides a simplified and reliable construction for a high-pressure rotating water jet nozzle which is particularly well suited to industrial uses where the operating parameters can be in the range of 1,000 to 40,000 psi, rotating speeds of 1000 rpm or more and flow rates of 2 to 50 gpm. The present disclosure in particular is directed to such a nozzle that has rotary speed control so as not to rotate at very high speeds.

A typical high pressure rotary water jet nozzle is offered by StoneAge Inc. known as the "Banshee" nozzle. This nozzle is described in some detail in our U.S. Pat. Nos. 7,635,096; 8,006,920 and 8,016,210, among others. During pressurized operation of the nozzle, axial forces on the tubular shaft reach equilibrium minimizing axial contact between the tubular shaft and the housing body. Also, the tubular shaft member is thereby supported within the housing body entirely by fluid between the shaft member and the housing body. As a result, this nozzle typically can rotate at speeds as high as 40,000 rpm. Such speeds may be fine for small tube operations, such as heat exchanger tubes, where the speed of the nozzle jet moving across the surface or wall of the tube may be in a range of 50 to 100 feet per second. However, it has been shown that speeds along a surface faster than about 60 feet per second tend to show deterioration of jet impact. Hence there is a need for a slower speed rotary water jet nozzle in which rotational speed is more limited so as to effectively deal with hard to remove deposits/materials in piping systems.

A prior art nozzle as disclosed in U.S. Pat. No. 8,016,210 is shown in FIG. 1 in which the functional features described are combined and provided in a simplified structure. For there to be an axial resistive force it is unnecessary that there be a surface which is actually perpendicular to the shaft axis so long as there is a surface with an areal component which is effectively perpendicular to the rotational axis. In the simplified structure shown in FIG. 1 the port from the shaft bore 11 communicates directly with the tapered outlet passage 31, which serves the dual function of being a balancing chamber or cavity, where a balancing resistive force is created and a regulator passage, to control the amount of pressure which creates the resistive force. Since a force acting at any point on the frusto-conical surface imparts both a radial force and an axial force, the total of such forces over the surface creates a net axial force and with no net radial force. The annular groove 41 around the tapered portion of housing portion B facilitates distribution of the pressurized fluid as it exits the bores 20 in the shaft A into the regulator passage 31 between the frusto-conical tapered portions of the cylindrical housing body portion B and the similarly tapered portion of the shaft A. A circumferential annular groove or chamber 42 in the inside wall of the portion C abutting the inlet bearing area 32 of shaft A provides a continuous unrestricted circumferential fluid circulation path around the shaft A in the inlet bearing area 32 between the rotating shaft A, and housing body portion C. Although inlet fluid is designed to weep axially past the inlet bearing area 32 in the embodiments shown in FIG. 1, the presence of this groove in the embodiment shown in FIG. 1 improves shaft stability. It is believed that the channel 42 may enhance circumferential distribution of the small weepage flow around the shaft A passing through the bearing area 32 which in turn minimizes the effects of precession of the shaft axis during operation.

Before the development of the type of nozzle described above, controlled speed nozzles required bearings submerged in viscous fluid, separated from the working fluid by high pressure seals. Such tools rotated in the range of 500-1000 rpm when new, but degraded relatively quickly during use and therefore such tools needed frequent maintenance which made such configurations very expensive to operate and maintain. Further, there was a limit on how small such nozzles could be made using bearings etc.

Large tube cleaning can alternatively be done with nozzles that utilize magnets and eddy current braking for speed control. However, such nozzles require bearings and seals, again adding to the initial and ongoing maintenance cost of such nozzles. Against this backdrop, what is still needed is a simple nozzle that can be speed controlled without the need for bearings, viscous fluid, or magnetic brakes, etc.

SUMMARY OF THE DISCLOSURE

This disclosure addresses this need. One embodiment of a nozzle assembly in accordance with the present disclosure is a water bearing rotary nozzle for use in a high pressure (HP) range of up to 40,000 psi having a "straight through" fluid path to a jet head at a distal end of the nozzle assembly where the head is preferably capable of providing rotating fluid jet coverage, which includes a speed reduction mechanism. A nozzle assembly for spraying high pressure fluid in accordance with the present disclosure is specifically designed to spray the fluid against an object such as an internal wall of a heat exchanger tube. In a typical nozzle assembly of this disclosure, the internal forces resulting from such operating pressures tend to create an axial thrust force acting against the rotating nozzle shaft within the nozzle body with a force corresponding to the operating pressure and cross sectional area of the shaft.

A nozzle assembly in accordance with the present disclosure also provides a straight-through fluid path in which the pressure of the operating fluid is allowed to reach and act upon opposing surfaces of the rotating nozzle shaft so as to effectively balance any axial thrust force. This is accomplished by providing a "bleed hole" to allow a small portion of pressurized fluid within the rotating nozzle shaft to reach a chamber or channel within the housing but outside the exterior of the forward portion of the nozzle rotary shaft member where the fluid pressure can act upon the nozzle shaft member with a sufficient axial component so as to balance the corresponding axial component against the nozzle shaft created by the internal fluid pressure. This chamber or channel communicates with the exterior of the device by means of a slightly tapered frusto-conical bore in the nozzle body surrounding a corresponding tapered portion of the rotating shaft member providing a tapered frusto-conical gap defined between the tubular shaft member and the cylindrical housing body which further allows the fluid to flow between the body and the shaft to facilitate or lubricate the shaft rotation.

Because of the tapered shape, the spacing between the nozzle housing body and the rotating shaft member varies slightly with axial movement of the shaft and creates a "self balancing" effect in which the axial forces upon the shaft remain balanced and there is always some fluid flowing between the shaft and housing which helps decrease contact and resulting wear between these two components. Due to the lack of any significant imbalanced radial forces and the fluid flowing between the surfaces of the shaft and housing, a nozzle assembly or device of the present disclosure can be constructed without need for mechanical bearings.

Around the inlet end of the tubular rotary shaft member is a centrifugal set of weight segments. These weight segments are rotationally captured with the inlet end of the shaft within the nozzle housing body and are separable outwardly, preferably radially, from between the inlet end of the shaft toward the internal surface of the housing. In one embodiment of the nozzle assembly, these segments are configured to ride along a transverse linear rail machined in the rotary shaft between the tapered portion and the inlet end of the rotary tubular shaft. In one embodiment the transverse linear rail encompasses the central axial passage through the rotary tubular shaft. Each side of the rail preferable has a ridge or rib engaging a complementary slot in each of the weight segments such that segment movement is constrained to move laterally away from the central axis of the shaft along the rib of the rail only as rotational speed of the tubular shaft increases. The weight segments then press against the inner surface of the housing creating a drag force against the housing to slow and limit the speed of shaft rotation.

A nozzle assembly for spraying high pressure fluid against an object in accordance with the present disclosure includes a hollow cylindrical housing body and a hollow tubular rotatable shaft member coaxially carried within the housing body. The rotatable shaft has a fluid inlet end within and near one end of the housing body and an outlet end near a second end of the housing body for securing a spray head thereto for rotation with the shaft. The shaft member has a central passage to conduct fluid from the inlet end to the outlet end. The housing body has a high pressure fluid inlet passage communicating with the central passage of the shaft and the housing body has an inlet bearing area supporting the inlet end of the tubular shaft member. This housing body preferably includes an inlet nut threadably fastened thereto which supports the inlet end of the rotatable shaft member and which in turn is configured to connect to a source of high pressure fluid such as a hose.

The nozzle assembly includes a regulating passage formed between an inner surface of the housing body and an outer surface of the rotatable shaft member and one or more bores communicating, i.e. extending, between the central passage of the shaft member and this regulating passage. Pressure of fluid within the regulating passage acts axially upon the shaft to counterbalance axial force on the shaft exerted by fluid pressure acting upon the inlet end of the shaft. The regulating passage is preferably a tapered frusto-conical gap defined between the tubular shaft member and the housing body. A plurality of partial annular weight segments is disposed between the regulating passage and the housing body and adjacent the inlet bearing area of the housing body and captured between the inlet end of the shaft member and the cylindrical housing body. These weight segments are constrained to rotate with the shaft member but are free to separate outwardly, preferably radially and laterally from the shaft member and press against an inner wall surface of the cylindrical housing body to reduce rotational speed of the shaft member within the cylindrical housing body during nozzle operation.

In one exemplary embodiment, the centrifugal weight segments are preferably two half annular segments disposed on the shaft member adjacent the inlet bearing area of the housing body. During pressurized operation of the nozzle assembly, axial forces on the tubular shaft reach equilibrium, so that there is no axial contact between the tubular shaft and the housing body. Hence, during pressurized operation of the nozzle, the tubular shaft member is supported within the housing entirely by a flow of operating fluid between the shaft and the housing body, and rotation of the shaft is caused by reaction forces generated by high pressure fluid.

A nozzle assembly in accordance with the present disclosure may also be viewed as including a hollow cylindrical housing body and a hollow tubular shaft member coaxially carried within the housing body. The shaft member has a fluid inlet end within and near one end of the housing body and an outlet end projecting from a second end of the housing body. This outlet end is configured to receive a spray head fastened thereto for rotation of the head with the shaft. The shaft member has a central passage to conduct fluid from the inlet end to the outlet end. The housing body has a high pressure fluid inlet passage communicating with the central passage of the shaft member.

An inner wall of the housing body and a portion of the shaft member toward the outlet end of the shaft have complementary tapered surface shapes, together forming a regulating passage therebetween. The shaft member has one or more bores communicating between the central passage through the shaft member and the regulating passage, wherein pressure of cleaning fluid within the regulating passage acts axially upon the shaft to counter axial force on the shaft resulting from fluid pressure acting upon the inlet end of the shaft. The inlet end of the shaft member carries at least a pair of partial annular weight segments therearound captured between the shaft member and the cylindrical housing. These segments are free, i.e. operable, to separate laterally, i.e. move outward radially from the shaft member under centrifugal force, as the shaft member rotates, and press against the inner wall of the cylindrical housing body to reduce rotational speed of the shaft member within the cylindrical housing body during nozzle operation.

The regulating passage in this nozzle assembly is preferably a frusto-conical gap defined between the tubular shaft member and the cylindrical housing body. The volume of the regulating passage varies as the tubular shaft moves axially within the housing body. During pressurized operation of the nozzle, axial forces on the tubular shaft reach equilibrium minimizing axial contact between the tubular shaft and the housing body. Also, the tubular shaft member is thereby supported within the housing body entirely by a fluid film or layer of water acting as a bearing between the shaft member and the housing body.

The shaft member has a feature operable to constrain movement of the weight segments to only toward and away from the central passage through the shaft member during nozzle operation. This feature may include a linear rail extending laterally across the shaft member adjacent the central passage. Preferably this linear rail crosses the central passage through the shaft member. Preferably the lateral straight rail formed in the shaft member between the inlet end of the shaft member and the tapered surface portion of the shaft member extends radially from the central passage. This rail carries on it the partial annular weight segments such that they slidably move outward toward the inner wall of the housing body during shaft member rotation during nozzle operation. These weight segments engaging the inner wall of the housing body during nozzle operation provide a limiting force on rotation of the shaft member and hence limit the speed of rotation. This rail preferably has a constant cross-sectional shape. Each of the segments has a shape complementary to the cross-sectional shape of the rail. Preferably the rail includes a feature such as at least one linear ridge, tab or rib and each weight segment has a groove complementary to the at least one tab or rib to constrain movement of the segment in a radial direction toward or away from the central passage through the tubular shaft member and preclude axial movement of the weight segments along the axis off the shaft member. Finally, the outer curved surface of each of the weight segments may include a plurality of peripheral grooves.

DETAILED DESCRIPTION OF THE DISCLOSURE

Figure 1:
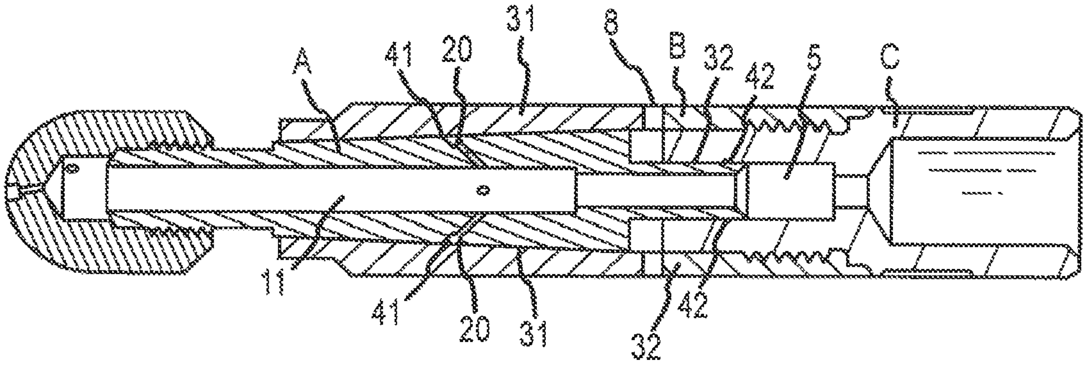
FIG.1 PRIOR ART
FIG. 1 is a longitudinal cross-section of a prior art nozzle in which a tapered regulator passage also serves as a balancing chamber.
Figure 2:
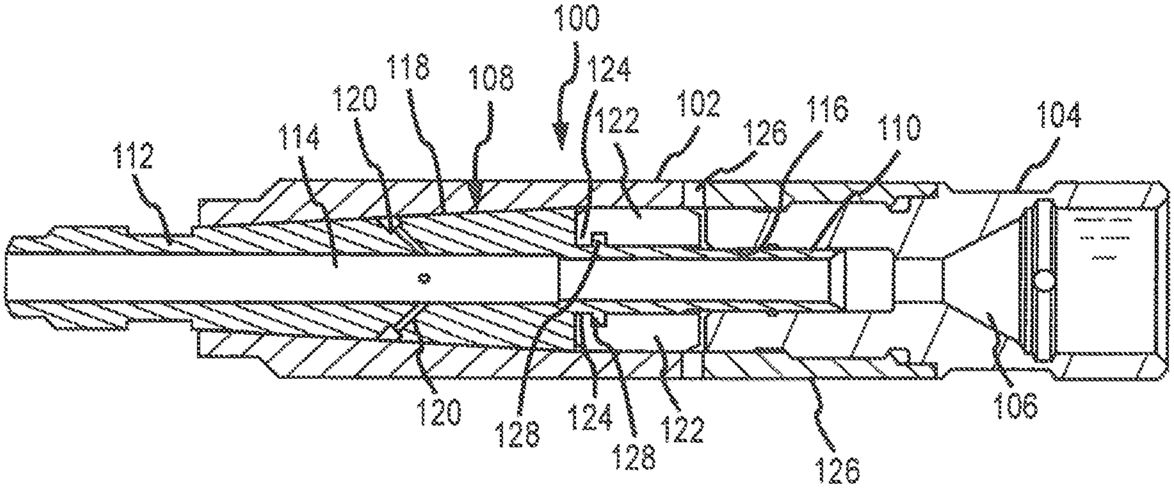
FIG. 2 is a longitudinal cross-section of a nozzle in accordance with the present disclosure in which a portion of the inlet portion of the shaft carries a separate pair of centrifugal weight segments.
Figure 3:
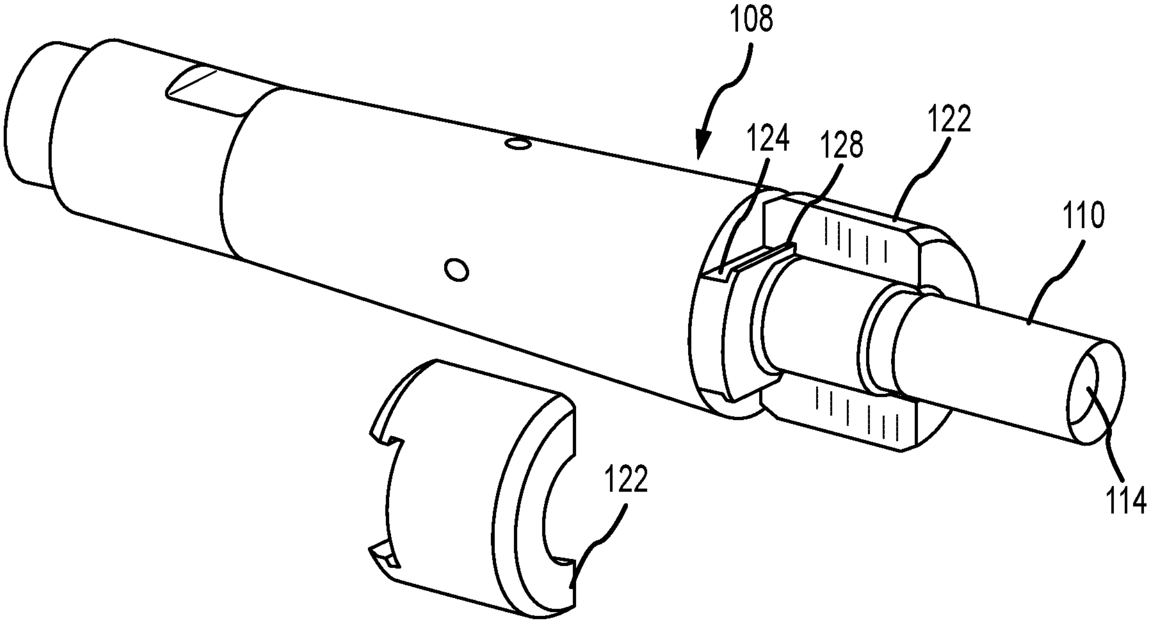
FIG. 3 is a separate partial exploded perspective view of the rotary shaft removed from the nozzle shown in FIG. 2 showing one of the centrifugal segments separated laterally from the shaft.

One exemplary embodiment of a nozzle assembly 100 in accordance with the present disclosure is shown in FIGS. 2 and 3. FIG. 2 shows a longitudinal cross sectional view of the nozzle 100 without a spray head attached. The nozzle assembly 100 includes a hollow cylindrical housing body 102 threadably fastened to a hollow cylindrical inlet nut 104 that forms an inlet end portion of the cylindrical housing body 102 and which has a central axial passage 106. The inlet nut 104 is in turn fastened to a high pressure fluid hose (not shown) for directing high pressure fluid into and through the nozzle 100. A hollow tubular rotatable shaft member 108 is coaxially carried within the housing body 102 and captured therein by the inlet nut 104. Thus the inlet nut 104 together with the housing body 102 constrain and capture the rotatable shaft member 108 therein. This tubular shaft member 108 has a fluid inlet end 110 within and near one end of the housing body 102, which is supported by the inlet nut 104. The tubular shaft member 108 has an outlet end 112 near a second end of the housing body 102 for securing a spray head thereto (not shown) for rotation with the shaft member 108 and directing fluid against an object.

Figure 4:
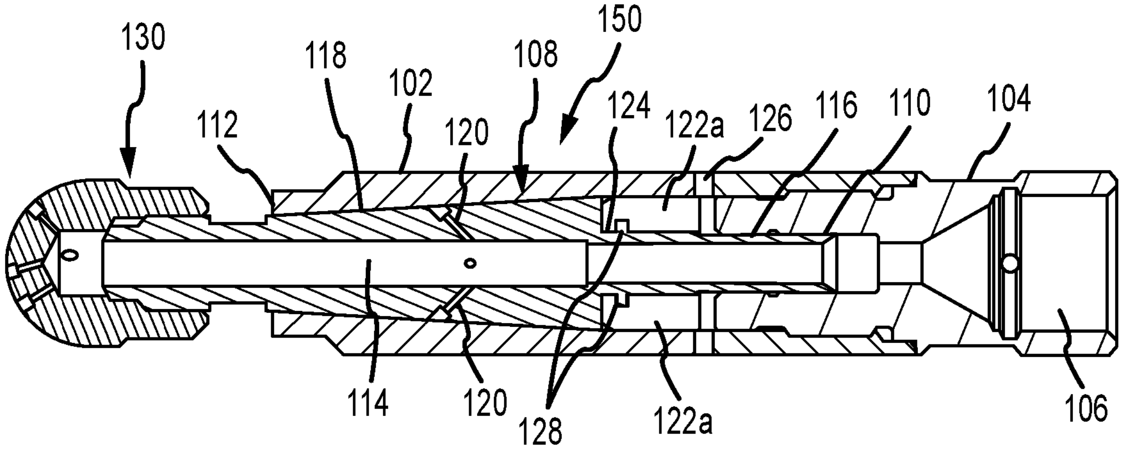
FIG. 4 is a longitudinal cross-section view of an alternative nozzle shown in FIG. 2 in which a rib on the lateral straight rail engages a complementary recess or groove in each segment to prevent axial movement of the centrifugal segments along the inlet end of the shaft.

The tubular shaft member 108 has an axial central passage 114 to conduct fluid from the inlet end 110 to and through the outlet end 112 to a spray head 130, shown in FIG. 4. The high pressure fluid inlet passage 106 in the housing body 102 through inlet nut 104 coaxially communicates with the central passage 114 of the tubular shaft member 108. The housing body 102 has an inlet bearing area 116 formed by the inlet nut 104 supporting the inlet end 110 of the tubular shaft member 108.

A regulating passage 118 is formed between the housing body 102 and an outer surface of the shaft 108. In preferred embodiments, the regulating passage 118 is a tapered frusto-conical gap defined between the tubular shaft 108 and the cylindrical housing body 102. One or more bores 120 extend between the central passage 114 of the tubular shaft member 108 and the regulating passage 118. Pressure of fluid within the regulating passage 118 acts axially upon the shaft member 108 to counterbalance axial force on the tubular shaft member 108 exerted by fluid pressure acting upon the inlet end 110 of the tubular shaft member 108.

A plurality of partial annular segments 122 are disposed on the shaft member 108 adjacent the distal end of the inlet nut 104 between the inlet bearing area 116 of the housing body 102 and the regulating passage 118, captured between the inlet end 110 of the shaft member 108 and the cylindrical housing body 102 and constrained to rotate with the shaft member 108. In the exemplary embodiment shown in FIGS. 2 and 3, there are two half annular segments 122. These segments 122 are free to separate outwardly, in this case laterally, i.e. radially, from the shaft member 108 and press against the inside wall surface of the cylindrical housing body 102 to reduce rotational speed of the shaft member 108 within the cylindrical housing body 102 during nozzle operation.

Each of the segments 122 slides laterally on a transverse straight rail 124 formed in the tubular shaft 108. This transverse straight rail 124 formed in the shaft 108 includes a feature 128 thereon which prevents axial movement of the weight segments 122 toward the inlet end 110 of the shaft member 108. Preferably this feature 128 is a raised rib or tab extending outward from the rail 124. Each of the segments 122 has a complementary shape feature 130 to engage the rail 124 with its tab or rib feature 128 so as to slide or ride on the rail 124 only laterally, i.e. radially, during nozzle operation.

As the shaft 108 rotates in the housing body 102, contact between the weight segments 122 and the rail 124 causes the segments to rotate with the shaft 108. As the shaft rotates, centrifugal force pushes the segments 122 radially outward, eventually contacting the inner wall of the housing body 102 and providing a drag force against further rotational speed. Some of the high pressure fluid from the regulating passage 118 leaks past and provides some lubrication to the segments 122. This leakage fluid then exits through the discharge ports 126 through the housing body 102.

In the embodiment shown in FIGS. 2 and 3, the semi-annular centrifugal weight segments 122 are constrained to rotate with the shaft 108 because of the transverse rail 124. The centrifugal weight segments 122 are prevented from movement axially back and forth along the inlet end of the shaft 108 by engagement between the tab or rib feature 128 with its complementary feature 130 on the weight segments 122.

Figure 5:
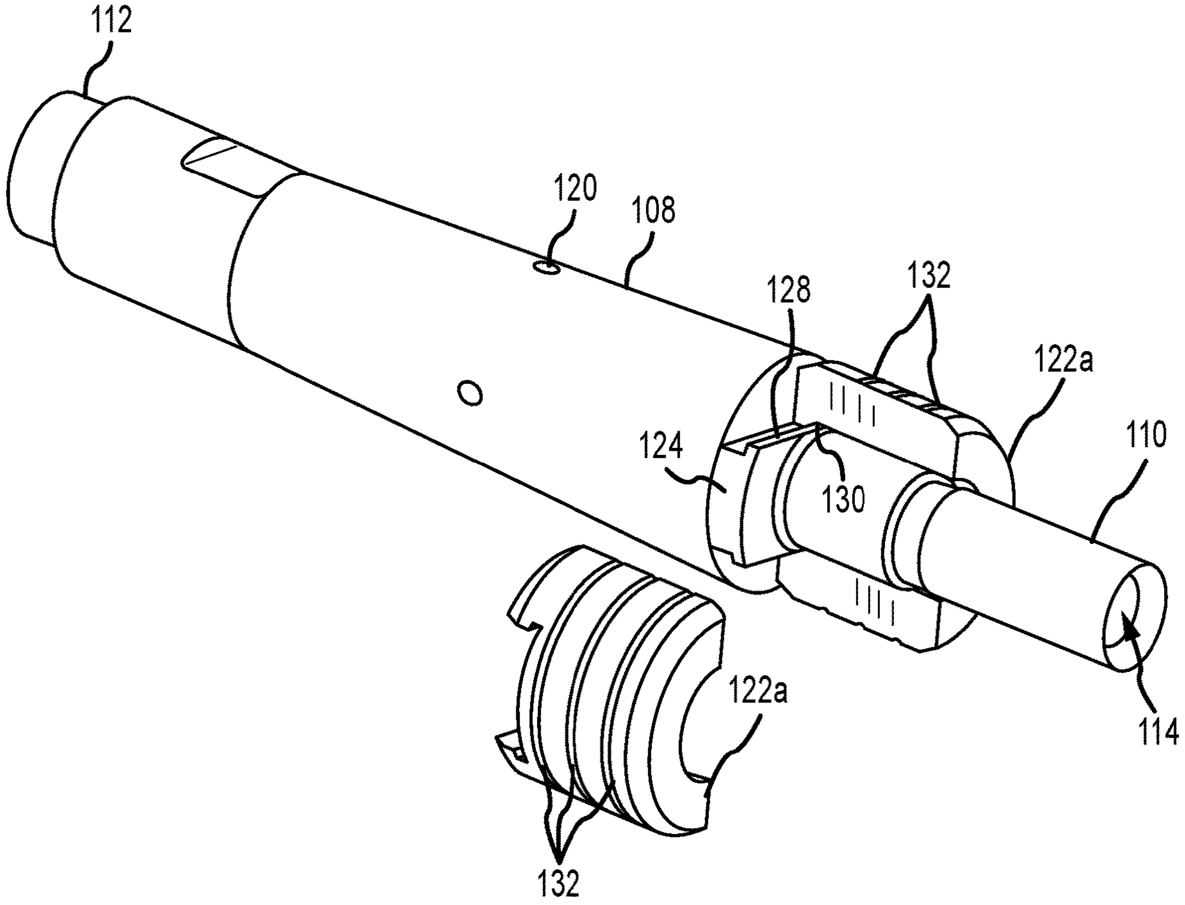
FIG. 5 is separate partial exploded perspective view of the rotary shaft shown in FIG. 4 showing one of the separable centrifugal segments separated laterally from the shaft.

Another embodiment of a nozzle assembly 150 in accordance with the present disclosure is shown in FIGS. 4 and 5. Again, the nozzle 150 includes a hollow cylindrical housing body 102 threadably fastened to a hollow cylindrical inlet nut 104 that forms an inlet end portion of the cylindrical housing body 102 and which has a central axial passage 106. The inlet nut 104 is in turn fastened to a high pressure fluid hose (not shown) for directing high pressure fluid into and through the nozzle 150. A hollow tubular rotatable shaft member 108 is coaxially carried within the housing body 102 and captured therein by the inlet nut 104. Thus the inlet nut 104 together with the housing body 102 constrain and capture the rotatable shaft member 108 therein. This shaft member 108 has a fluid inlet end 110 within and near one end of the housing body 102, which is supported by the inlet nut 104. The shaft member 108 has an outlet end 112 near a second end of the housing body 102 for securing a spray head thereto (not shown) for rotation with the shaft member 108.

The shaft member 108 has an axial central passage 114 to conduct fluid from the inlet end 110 to and through the outlet end 112 to a spray head 130, shown in FIG. 4. The high pressure fluid inlet passage 106 in the housing body 102 through inlet nut 104 coaxially communicates with the central passage 114 of the shaft member 108. The housing body 102 has an inlet bearing area 116 formed by the inlet nut 104 supporting the inlet end 110 of the tubular shaft member 108.

A regulating passage 118 is formed between the housing body 102 and an outer surface of the shaft 108. One or more bores 120 communicate between the central passage 114 of the shaft member 108 and the regulating passage 118. Pressure of fluid within the regulating passage 118 acts axially upon the shaft member 108 to counterbalance axial force on the shaft member 108 exerted by fluid pressure acting upon the inlet end 110 of the shaft member 108.

A pair of partial annular weight segments **122*a* are disposed on the shaft member 108 adjacent distal end of the inlet nut 104 and between the inlet bearing area 116 of the housing body 102 and the regulating passage 118 and captured between the inlet end 110 of the shaft member 108 and the cylindrical housing body 102 and constrained to rotate with the shaft member 108, wherein the segments are free to separate laterally from the shaft member 108 and press against the inside wall surface of the cylindrical housing body 102 adjacent the inner, or distal, end of the inlet nut 104 to reduce rotational speed of the shaft member 108 within the cylindrical housing body 102** during nozzle operation.

Each of the weight segments **122*a* slides laterally on a transverse straight rail 124 formed in the shaft 108 that extends fully across the shaft 108. As the shaft 108 rotates in the housing body 102, contact between the segments 122*a* and the rail 124 causes the segments to rotate with the shaft 108. As the shaft rotates, centrifugal force pushes the segments 122*a* radially outward, eventually contacting the inner wall of the housing body 102 and providing a drag force against further rotational speed. Some of the high pressure fluid from the regulating passage 118 leaks past and provides some lubrication to the segments 122*a*. This leakage fluid then exits through the discharge ports 126 through the housing body 102**.

This nozzle 150 is the same as that shown in FIGS. 2 and 3 wherein the shaft 108 is provided with a feature such as a rib 128 along each side of the rail 124 and each semi-annular segment **122*a* has a complementary feature such as a slot 130 to accommodate the ridge or rib 128 of the rail 124. This configuration with each segment 122*a* having a complementary slot 130 prevents any axial movement of the centrifugal segments 122*a* along the axis of the shaft 108. However, in this nozzle 150, each of the weight segments 122*a* has a series of spaced peripheral grooves 132 formed in its outer surface. These grooved weight segments 122*a* unexpectedly results in a further reduction in rotational speed of the nozzle 150 during operation than the configuration shown in FIGS. 2 and 3**.

The following table illustrates this result:

| Torque, in-lb | Standard Tool RPM | Counterweight RPM | Grooved Counterweight RPM |
|---|---|---|---|
| .09 | 16000 | 5000 | 4100 |
| .19 | 20000 | 8100 | 5000 |
| .29 | 28000 | 9200 | 6600 |
| .38 | 30000 | 10700 | 8100 |
| .48 | 35000 | 12200 | 9800 |
| .58 | 38000 | 14400 | 11500 |

The high pressure nozzle cylindrical housing body 102 and tubular shaft member 108 are preferably made of a high strength stainless steel. Each of the partial annular weight segments in the embodiments described herein is preferably made of a non-galling metal or a metal coated with an anti-galling material to prevent galling of the segment against the rail 124 or the inner surface of the cylindrical housing body 102. One such non-galling metal is 660 Bronze, which was used in the above example and in the embodiments described below.

Many changes may be made to the rotary nozzle assembly described above without departing from the scope of the present disclosure. For example, the weighted segments may be three, four or five or more partial annular segments wherein at least two are restrained by a radially extending rail such that the segments cannot rotate about the shaft member and can only move outward radially as the shaft member rotates about the central passage. The rail 124 and/or ribs 128 may be other than as specifically shown. For example, the rail 124 may include discrete tabs rather than continuous ribs. The rail 124 may have a dovetail cross-sectional shape rather than utilizing a raised rib or ridge 128 at right angles as illustrated to prevent axial movement of the segments 122 or **122*a* along the rail 124**.

Figure 6:
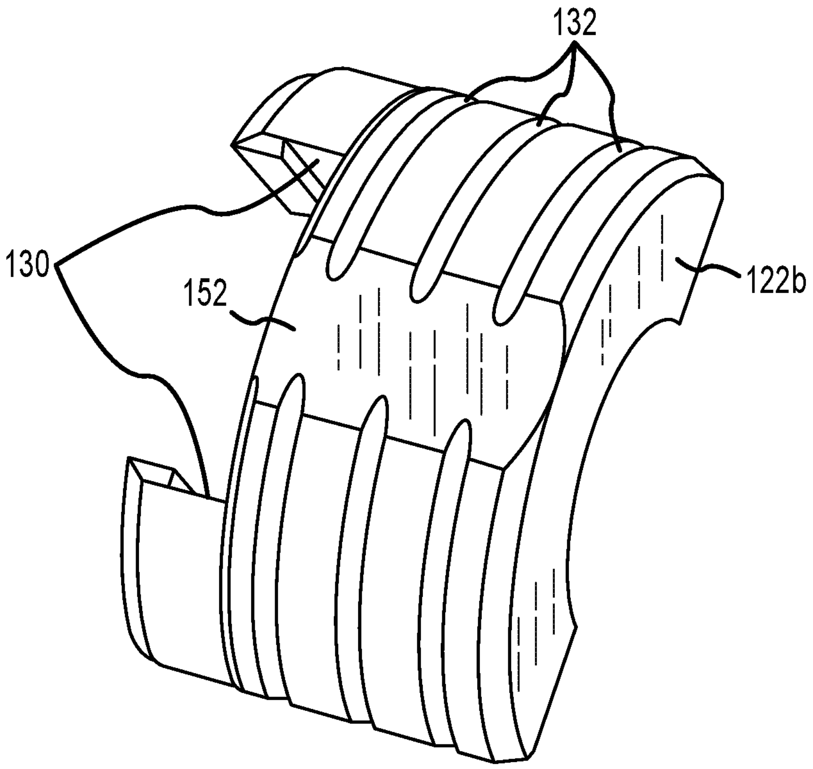
FIG. 6 is a separate perspective view of a first alternative configuration of a separable centrifugal segment having peripheral grooves and a straight peripheral axial flat surface.

A first exemplary alternative configuration **122*b* of a weight segment 122 is shown in FIG. 6. In this embodiment of a nozzle 150, segment 122*b* is the same as 122*a* except for a partial axially extending flat surface 152 formed or milled on the outer surface of each of the segments 122*b* extending axially across each of the peripheral grooves 132**.

This flat surface 152 provides an axial fluid leakage path during nozzle operation. Alternatively the axially extending flat surface 152 may be replaced with an axially grooved outer curved surface (not shown).

Figure 7:
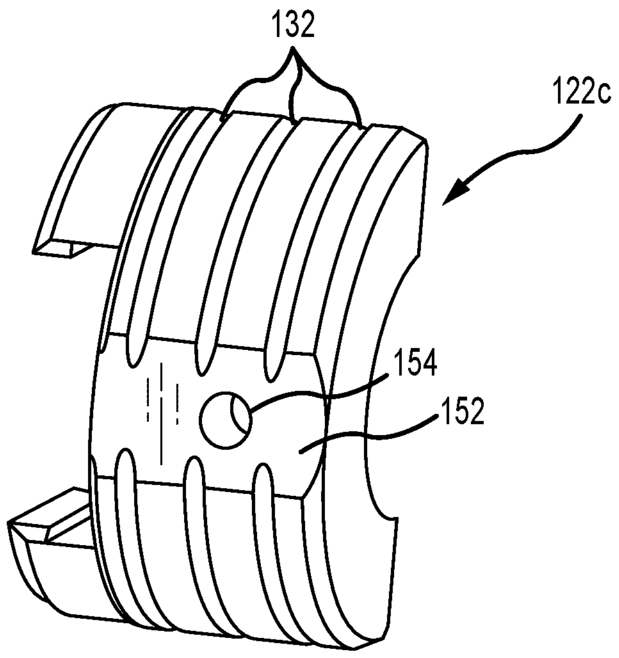
FIG. 7 is a separate perspective view of a second alternative configuration of a separable centrifugal segment having peripheral grooves as in FIG. 6 and a radial bore through the centrifugal segment into the axial flat surface.

A second exemplary alternative configuration 122*c* of a weight segment 122 in accordance with the present disclosure is shown in FIG. 7. In this exemplary configuration each weight segment 122*c* has a radial bore 154 extending radially through the segment 122*c* to the axial flat surface 152. This configuration provides another fluid leakage path.

Figure 8:
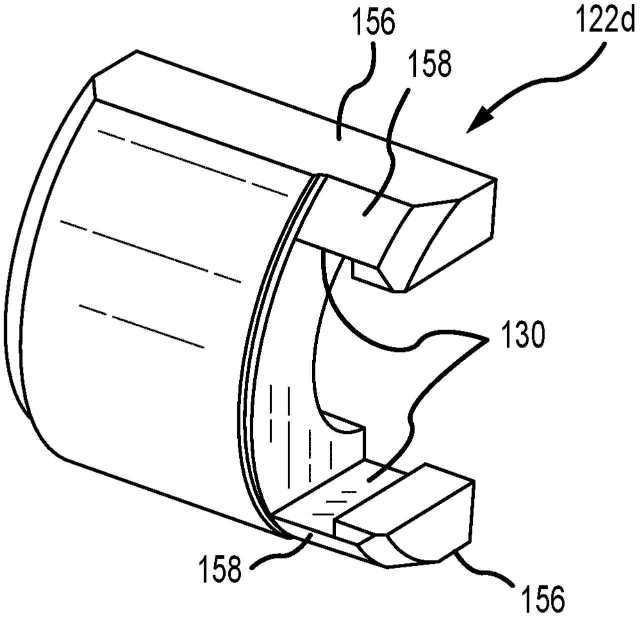
FIG. 8 is a separate perspective view of a third alternative embodiment of a centrifugal segment as shown in FIGS. 2 and 3 having a pair of opposite axially extending flat surfaces.

A third exemplary alternative configuration of a weight segment 122*d* in accordance with the present disclosure is shown in FIG. 8. In this embodiment, the weight segment 122*d* has a smooth outer surface as the segments 122 shown in FIGS. 2 and 3, but has a pair of axially extending external flats 156 in its outer surface adjacent the edges mating with the corresponding opposite segment 122*d* and has a recessed out portion 158 over the slot 130. Again, this configuration changes the leakage path as the segments are centrifugally thrust radially outward during nozzle operation.

Figure 9:
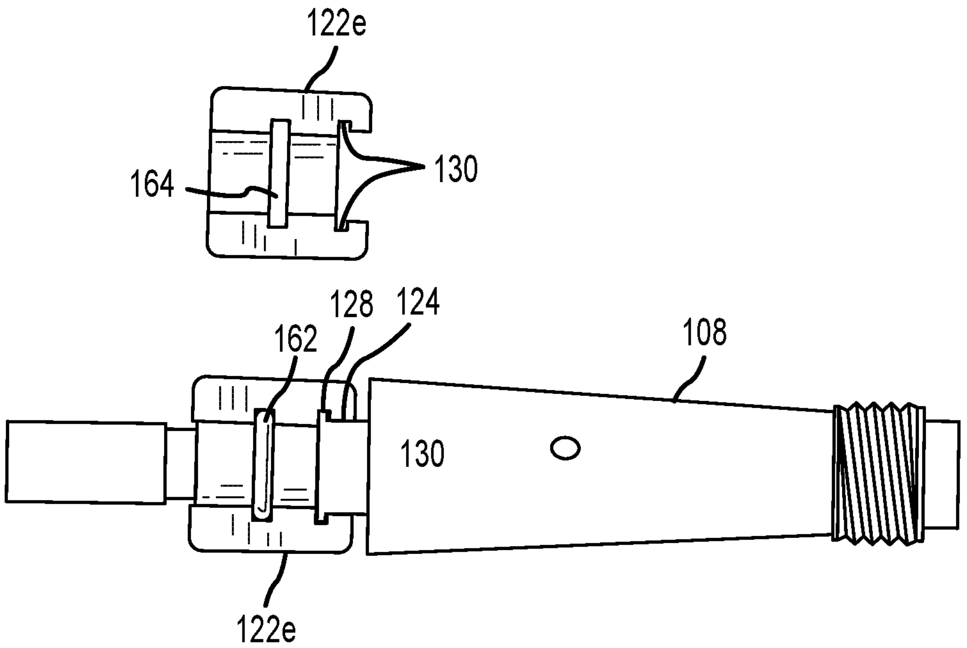
FIG. 9 is a fourth alternative embodiment of a rotational shaft from the nozzle shown in FIGS. 2 and 3 with a fourth alternative set of centrifugal weight segments with an O-ring positioned between the segments and around the inlet end of the rotational shaft.

Another variation is shown in FIG. 9. In this embodiment of a nozzle 150 a silicon O-ring 162 is slipped onto the stem 110 of the shaft 108 and each of the segments 122*e* has a corresponding half annular groove 164 or recess formed in its inner surface sized to receive the O-ring 162 therein. The outer cylindrical surface of each segment 122*e* may be smooth as shown in FIG. 3, or may be configured with peripheral circular grooves 132, a radial bore 154 such as is shown in FIG. 7, or axial flats 156 as shown in FIG. 8, or any combination of these configurations so as to cause a desired reduction of rotational speed.

Figure 10:
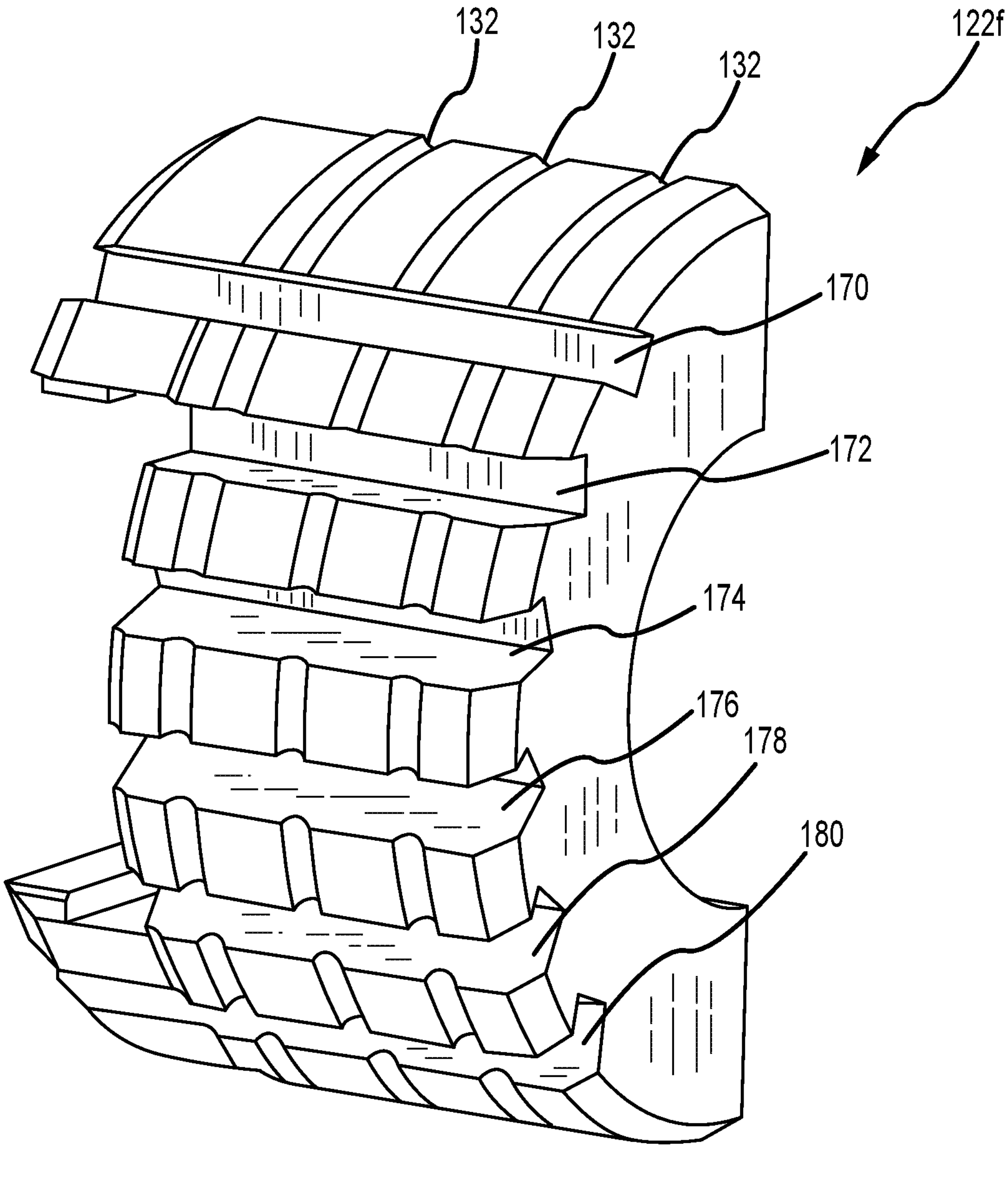
FIG. 10 is a separate perspective view of a fourth alternative configuration of a separable centrifugal segment shown in FIG. 4 including peripheral axial slots or grooves.

A fourth exemplary alternative configuration of a weight segment 122*f* in accordance with the present disclosure is shown in FIG. 10. In this embodiment, the weight segment 122*f* is the same as that shown in FIGS. 4 and 5 in which the outer surface has a plurality of spaced peripheral circular grooves 132. However, in this embodiment each weight segment 122*f* also has a series of radially spaced axial channels or slots 170, 172, 174, 176, 178 and 180. The sides of each of the slots may be parallel and each of the slots angled identically with reference to a tangent line to the periphery of the segment 122*f* in a direction of rotation of the nozzle 150 as shown or may be straight radial slots.

Figure 11:
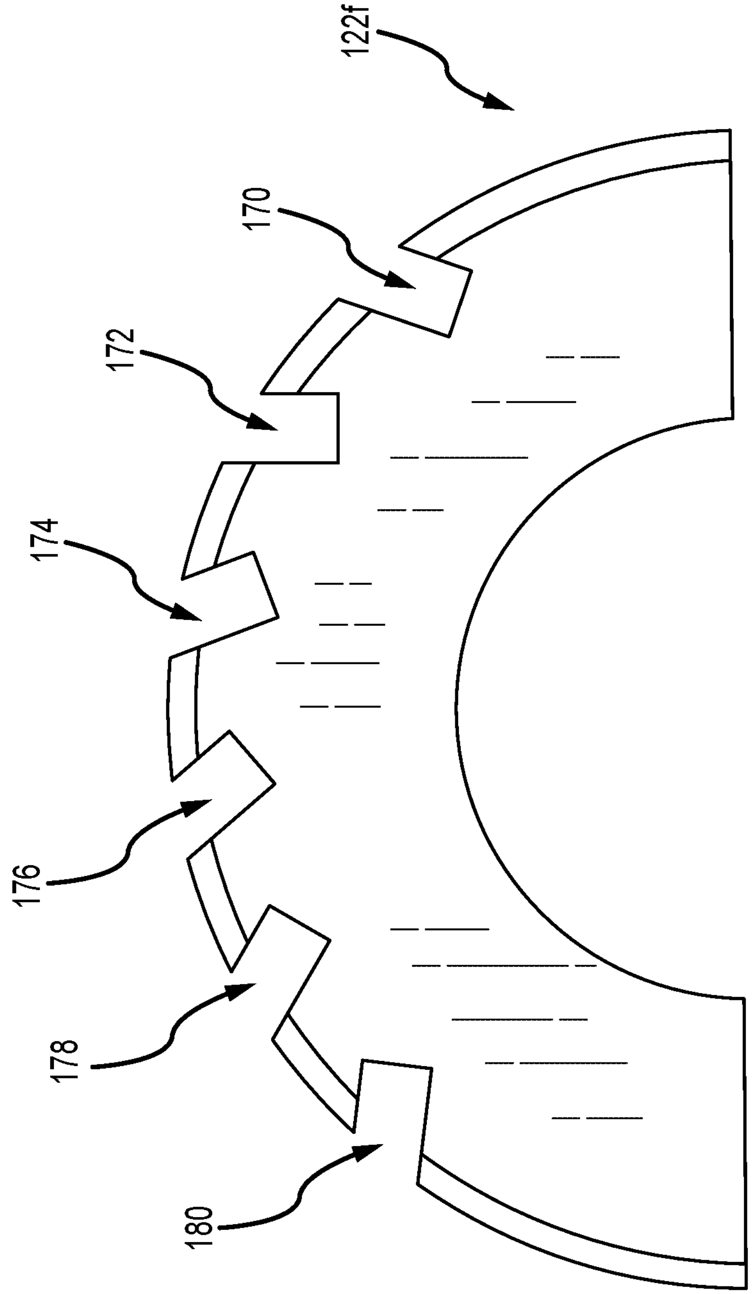
FIG. 11 is an end view of the separable centrifugal segment shown in FIG. 10.

An end view of the segment 122*f* is shown in FIG. 11. In this embodiment 122*f* there are six peripheral axial slots shown. Each of the slots 170-180 may preferably be angled with reference to a line tangent to the periphery of the segment to act on or add to the flowing stream of leakage or balancing water passing from the tapered portion of the shaft 108 to the discharge ports 126 in the nozzle body 102 generated during operation of the nozzle 150. These slots as shown have parallel sides as in a saw kerf. Alternatively the slots may be V or U shaped in cross section.

Figure 12:
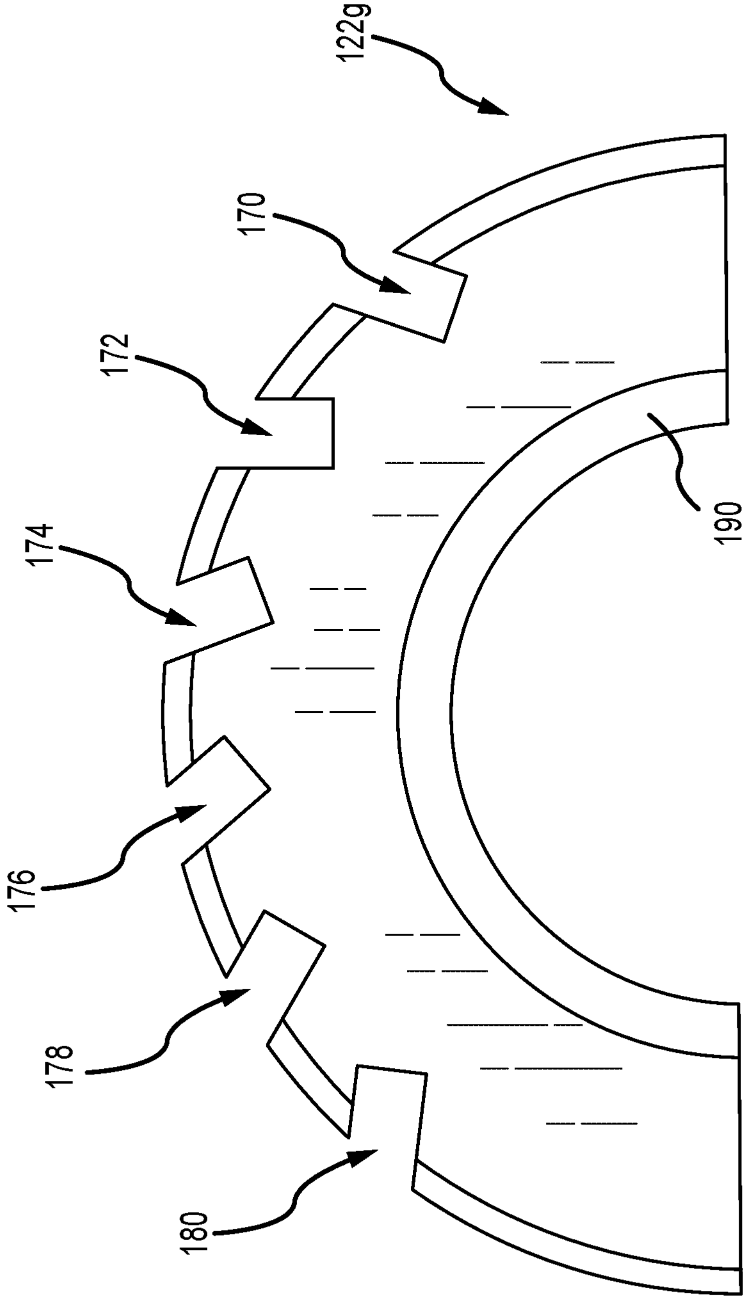
FIG. 12 is an end view of a fifth alternative configuration of a separable centrifugal segment.

A fifth alternative embodiment of a weight segment 122*g* is shown in an end view in FIG. 12. This weight segment is the same as that shown in FIGS. 10 and 11 except that it has an enlarged inlet end diameter which, when the pair of weight segments 122*g* are disposed on the shaft 108 as in FIG. 5, causes the weight segments 122*g* to form an annular recess 190 around the inlet end 110 of the shaft 108.

Again, as the shaft 108 rotates, centrifugal force pushes the segments 122*g* radially outward along the rail 124, eventually contacting the inner wall of the housing body 102 and exerting a drag force against the inner wall of the housing body 102 thereby reducing further rotational speed. Some of the high pressure fluid from the regulating passage 118 leaks past and provides some lubrication to the segments 122*g*. This leakage fluid then exits through the discharge ports 126 through the housing body 102. Each of the segments 122*g* has an inner diameter larger than the inlet end 110 of the shaft 108 toward the inlet end 110 so as to form an annular recess 190 around the shaft 108 at the inlet end 110 when both semi annular segments are mounted to the shaft 108 together on the rail 124. Each of the segments 122*g* may also be provided with peripheral annular grooves 132 and slanted axial grooves 170-180 as in the embodiment described above with reference to FIGS. 10 and 11 to enhance the speed retarding effect. During nozzle operation, this annular recess 190 facing the inlet end 110 of the tubular shaft member 108 effectively moves the applied counter force exerted by the leakage water closer to the rail 124 so that the segments 122*g* more uniformly exert force pressing outward against the inner wall of the housing 102. This tends to reduce uneven wear on the exterior surface of the segments 122*g*.

Many variations and combinations may be made to the above various embodiments of the retarding partial annular weight segments 122*a-g* described above. For example, in the weight segments 122*a* shown in FIG. 5, each segment 122*a* may be provided with a recess 190 formed at the inlet end of the segment 122*a* as is shown in the alternative embodiment 122*g* in FIG. 12. Weight segments 122*a* or 122*b* for example, may alternatively each include a radial bore 154 as shown in FIG. 7. Therefore all such changes, alternatives and equivalents in accordance with the features and benefits described herein, are within the scope of the present disclosure. Any or all of such changes and alternatives may be introduced without departing from the spirit and broad scope of this disclosure as defined by the claims below and their equivalents.

What is claimed is:

1. A nozzle assembly for spraying pressurized fluid against an object, the nozzle assembly comprising:
- a cylindrical housing body;
- a tubular shaft member coaxially and rotatably carried within the cylindrical housing body and having an inlet end within and near one end of the cylindrical housing body, the tubular shaft member having an outlet end near a second end of the cylindrical housing body for securing a spray head thereto for rotation with the tubular shaft member, the tubular shaft member having a central passage to conduct fluid from the inlet end of the tubular shaft member to the outlet end of the tubular shaft member;
- a regulating passage formed between the cylindrical housing body and an outer surface of the tubular shaft member;
- one or more bores communicating between the central passage of the tubular shaft member and the regulating passage, wherein pressure of the fluid within the regulating passage acts axially upon the tubular shaft member to counterbalance axial force on the tubular shaft member exerted by fluid pressure acting upon the inlet end of the tubular shaft member;
- a plurality of partial annular segments disposed on the tubular shaft member in the cylindrical housing body and captured on a rail extending laterally across the central passage between the inlet end of the tubular shaft member and the cylindrical housing body, wherein the plurality of annular segments are rotationally fixed to a raised rib extending outwardly from the rail to constrain the plurality of partial annular segments to rotate with the tubular shaft member, and wherein the plurality of partial annular segments are separable in an outward direction from the tubular shaft member and press against the cylindrical housing body thereby reducing rotational speed of the tubular shaft member within the cylindrical housing body during nozzle operation; and wherein each segment of the plurality of partial annular segments engages the rib to preclude axial movement of the plurality of partial annular segments.

2. The nozzle assembly according to claim 1 wherein the regulating passage is a tapered frusto-conical gap defined between the tubular shaft member and the cylindrical housing body.

3. The nozzle assembly according to claim 1 wherein each segment of the plurality of partial annular segments is a half annular segment disposed on the tubular shaft member between the regulating passage and an inlet bearing area of the cylindrical housing body.

4. The nozzle assembly according to claim 3 wherein the rail is formed on the tubular shaft member between the inlet end of the tubular shaft member and a tapered surface portion of the tubular shaft member.

5. The nozzle assembly according to claim 1 wherein the rail is formed between the inlet end of the tubular shaft member and a tapered surface portion of the tubular shaft member.

6. The nozzle assembly according to claim 1 wherein each segment of the plurality of partial annular segments has a partial internal recess facing the tubular shaft member.

7. The nozzle assembly according to claim 1 wherein the rail has a constant cross sectional shape and carries the plurality of partial annular segments.

8. The nozzle assembly according to claim 7 wherein each segment of the plurality of partial annular segments has a shape complementary to a cross sectional shape of the rail.

9. The nozzle assembly according to claim 7 wherein each segment of the plurality of partial annular segments has a groove complementary to the rib to constrain movement of the plurality of partial annular segments in a radial direction toward or away from the central passage through the tubular shaft member.

10. The nozzle assembly according to claim 9 wherein each segment of the plurality of partial annular segments has a partial axially flat outer surface.

11. The nozzle assembly of claim 1, wherein the plurality of partial annular segments is configured to travel radially outward upon rotation of the tubular nozzle shaft.

12. A nozzle assembly for spraying pressurized fluid against an object, the nozzle assembly comprising:

a housing body;

a tubular shaft member coaxially and rotatably carried within the housing body and having an inlet end and an outlet end, the tubular shaft member having a central passage to conduct fluid from the inlet end to the outlet end;

a regulating passage formed between the housing body and an outer surface of the tubular shaft member, wherein fluid pressure within the regulating passage counterbalances a force exerted by fluid moving through the central passage of the tubular shaft member;

a plurality of partial annular segments;

a rail having a raised rib that extends outward from the rail, wherein the rail extends laterally across the central passage;

wherein the plurality of annular segments are rotationally fixed to the raised rib to constrain the plurality of partial annular segments to rotate with the tubular shaft member, and wherein the plurality of partial annular segments are separable along the rail in an outward direction in response to a centrifugal force generated by rotation of the tubular shaft member, wherein the plurality of partial annular segments press against the housing body thereby reducing rotational speed of the tubular shaft member within the housing body during nozzle operation; and wherein each segment of the plurality of partial annular segments engages the rib to preclude axial movement of the plurality of partial annular segments.

13. The nozzle assembly according to claim 12 wherein each segment of the plurality of partial annular segments is a half annular segment disposed on the tubular shaft member between the regulating passage and an inlet bearing area of the housing body.

14. The nozzle assembly according to claim 12 wherein the rail is formed between the inlet end of the tubular shaft member and a tapered surface portion of the tubular shaft member.

15. The nozzle assembly according to claim 12 wherein the rail has a constant cross sectional shape and carries the plurality of partial annular segments.

16. The nozzle assembly according to claim 15 wherein each segment of the plurality of partial annular segments has a shape complementary to a cross sectional shape of the rail.

17. The nozzle assembly according to claim 15 wherein each segment of the plurality of partial annular segments has a groove complementary to the rib to constrain movement of the plurality of partial annular segments in a radial direction toward or away from the central passage through the tubular shaft member.

18. The nozzle assembly of claim 12, wherein the plurality of partial annular segments is configured to travel radially outward upon rotation of the tubular nozzle shaft.

* * * * *